United States Patent
Cudak et al.

(10) Patent No.: US 9,229,821 B2
(45) Date of Patent: Jan. 5, 2016

(54) REACTIONARY BACKUP SCHEDULING AROUND MEANTIME BETWEEN FAILURES OF DATA ORIGINATION

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 14/078,993

(22) Filed: Nov. 13, 2013

(65) Prior Publication Data

US 2015/0134899 A1    May 14, 2015

(51) Int. Cl.
*G06F 3/06*    (2006.01)
*G06F 11/14*    (2006.01)

(52) U.S. Cl.
CPC ............ *G06F 11/1461* (2013.01); *G06F 3/065* (2013.01); *G06F 3/0616* (2013.01); *G06F 3/0653* (2013.01); *G06F 3/0676* (2013.01)

(58) Field of Classification Search
CPC ... G06F 11/1461; G06F 3/0616; G06F 3/065; G06F 3/0653; G06F 3/0676
USPC .......... 711/112, 114, 154; 707/634, 640, 653; 714/6.3, 42, 47.1; 360/31
See application file for complete search history.

(56) References Cited

U.S. PATENT DOCUMENTS

| | | |
|---|---|---|
| 5,163,148 A | 11/1992 | Walls |
| 5,263,154 A | 11/1993 | Eastridge et al. |
| 5,675,725 A | 10/1997 | Malcolm |
| 5,758,067 A | 5/1998 | Makinen et al. |
| 5,765,173 A | 6/1998 | Cane et al. |
| 5,829,047 A | 10/1998 | Jacks et al. |
| 6,847,983 B2 | 1/2005 | Somalwar et al. |
| 6,934,725 B1 | 8/2005 | Dings |
| 7,100,072 B2 | 8/2006 | Galipeau et al. |
| 7,284,104 B1 | 10/2007 | Wu et al. |
| 7,302,609 B2 | 11/2007 | Matena et al. |

(Continued)

FOREIGN PATENT DOCUMENTS

WO    9923562 A1    5/1999

OTHER PUBLICATIONS

Gerlach et al.; "Fault-Tolerant Parallel Applications with Dynamic Parallel Schedules: A Programmer's Perspective"; Dependable Systems, LNCS 4028, pp. 195-210, 2006., Springer-Verlag Berlin Heidelberg 2006.

(Continued)

*Primary Examiner* — Stephen Elmore
(74) *Attorney, Agent, or Firm* — Jeffrey L. Streets

(57) ABSTRACT

A processor-implemented method for providing a reactionary backup scheduling of a hard disk drive is provided. The method may include monitoring a disk usage of the hard disk drive and comparing the disk usage to an MTBF of the hard disk drive. The method may also include monitoring usage of at least one file of a plurality of files stored on the hard disk drive. The method may further include initiating the reactionary backup scheduling based on the comparing of the disk usage to the MTBF and the monitoring of the usage of the at least one file in the plurality of files.

20 Claims, 3 Drawing Sheets

(56) References Cited

U.S. PATENT DOCUMENTS

| | | |
|---|---|---|
| 7,739,465 B2 | 6/2010 | Kameyama et al. |
| 7,870,548 B2 | 1/2011 | Chu Chen et al. |
| 8,244,974 B2 * | 8/2012 | Keohane et al. ............. 711/112 |
| 2003/0093443 A1 | 5/2003 | Huxoll |
| 2005/0097287 A1 | 5/2005 | Melament et al. |
| 2014/0032833 A1 * | 1/2014 | Cudak et al. ................. 711/112 |

OTHER PUBLICATIONS

Storagecraft; "ShadowProtect 4—ShadowProtect User Guide"; StorageCraft Technology Corporation, Draper Utah, 2010 StorageCraft Technology Corporation, Copyright (c) 2006-2011 storageCraft Technology Corporation, pp. 1-101.

\* cited by examiner

REACTIONARY BACKUP SCHEDULING AROUND MEANTIME BETWEEN FAILURES OF DATA ORIGINATION

FIELD OF THE INVENTION

The present invention relates generally to the field of computing, and more particularly to data backups.

BACKGROUND

In information technology a backup, or the process of backing up, refers to the copying and archiving of computer data so it may be used to restore the original data after a data loss event. The primary purpose of a backup is to be able to recover data after the data has been deleted or corrupted. Another purpose of backups may be to recover data from an earlier time, according to a user-defined data retention policy, typically configured within a backup application for how long copies of data are required. Before data is sent to its storage location, it is selected, extracted, and manipulated. Many different techniques have been developed to optimize the backup procedure. Current methods for initiating data backups may include scheduling data backup, automatic copying of data to external storage devices, manual selection and copying of data to various storage devices, and paying for an external company to perform and store data.

However, current methods of data backup may perform the data backup without taking into account the health of the primary hard disk or the health of the secondary backup storage device. Furthermore, frequent backups performed to a secondary harddrive may prematurely wear out the secondary harddrive. Additionally, the current methods of data backup may be an input/output (I/O) intense process depending on the size and scope of the data area being backed up as well as the method being utilized to perform the data backup process. As such, system performance may be compromised by frequently backing up data areas.

SUMMARY

A processor-implemented method for providing a reactionary backup scheduling of a hard disk drive is provided. The method may include monitoring a disk usage of the hard disk drive and comparing the disk usage to an MTBF of the hard disk drive. The method may also include monitoring usage of at least one file of a plurality of files stored on the hard disk drive. The method may further include initiating the reactionary backup scheduling based on the comparing of the disk usage to the MTBF and the monitoring of the usage of the at least one file in the plurality of files.

A computer system for providing a reactionary backup scheduling based of a hard drive disk is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include monitoring a disk usage of the hard disk drive and comparing the disk usage to an MTBF of the hard disk drive. The method may also include monitoring usage of at least one file of a plurality of files stored on the hard disk drive. The method may further include initiating the reactionary backup scheduling based on the comparing of the disk usage to the MTBF and the monitoring of the usage of the at least one file in the plurality of files.

A computer program product for providing a reactionary backup scheduling of a hard drive disk is provided. The computer program product may include one or more computer-readable storage devices and program instructions stored on at least one of the one or more tangible storage devices, the program instructions executable by a processor. The computer program product may also include monitoring a disk usage of the hard disk drive and comparing the disk usage to an MTBF of the hard disk drive. The computer program product may also include monitoring usage of at least one file of a plurality of files stored on the hard disk drive. The computer program product may further include initiating the reactionary backup scheduling based on the comparing of the disk usage to the MTBF and the monitoring of the usage of the at least one file in the plurality of files.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
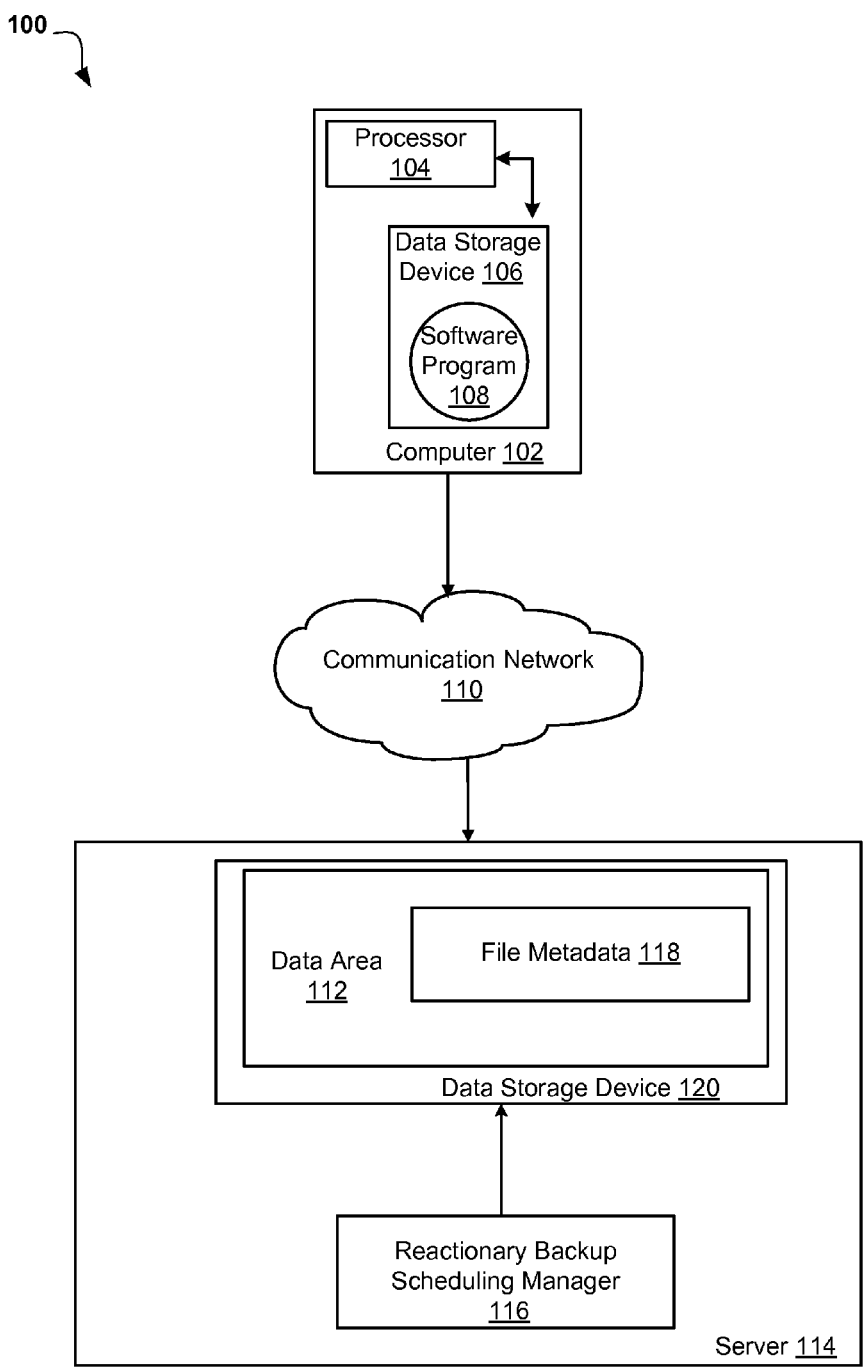
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to data backups. The following described exemplary embodiments may provide, among other things, a system, method and program product for providing a reactionary backup scheduling around the mean time between failures (MTBF) of a hard disk drive as well as scaling the number of alternate backup locations as a result of the same function.

Current methods of data backup perform the data backup without taking into account the health of the primary hard disk or the health of the secondary backup storage device. Furthermore, frequent backups performed to a secondary harddrive may prematurely wear out the secondary harddrive. Additionally, the current methods of data backup may be an input/output (I/O) intense process depending on the size and scope of the data area being backed up as well as the method being utilized to perform the data backup process. As such, system performance may be compromised by frequently backing up data areas.

As previously described, current methods for initiating data backups include scheduling, automatic copying of files to other devices, etc. However, running backups may slow performance due to the intense input/output (I/O) process and prematurely wearing out a harddrive. As such, it may be advantageous, among other things for a method to be able to intelligently determine when to initiate backups based on a function of the mean time between failure (MTBF) or the predictive failure analysis (PFA) of the hard disk drive as well as scaling the number of alternate backup locations as a result of the same function.

According to at least one embodiment of the present invention, a backup logic may be implemented which balances the schedule based system used today as well as the current method of duplicating writes for every file. Additionally, important file updates may be performed while maintaining the life span of a hard disk drive and the performance of the system. Furthermore, data may be protected by scaling the backup schedule as a function of the MTBF, PFA or similar hard disk health monitoring of a hard disk drive, such as the hard disk drive of the originating data or secondary storage location of the data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments provide a system, method and program product for providing a reactionary backup scheduling around the mean time between failures (MTBF) of a hard disk drive as well as scaling the number of alternate backup locations as a result of the same function.

According to at least one embodiment of the present invention, a system may determine when to initiate backups based on a function of mean time between failures (MTBF), predictive failure analysis (PFA) or other similar hard disk health monitoring of a hard disk drive, such as the originating hard disk drive as well as scaling the number of alternate backup locations. Additionally, according to at least one implementation, a file metadata may be updated to include information regarding the frequency of backup, resilience of locations, etc. As such, the optimization in backup scheduling may result in an increase in data protection as well as an optimization in backup locations.

Referring to FIG. 1, an exemplary networked computer environment 100 in accordance with one embodiment is depicted. The networked computer environment 100 may include a computer 102 with a processor 104 and a data storage device 106 that is enabled to run a software program 108. The networked computer environment 100 may also include a server 114 that is enabled to run a reactionary backup scheduling manager 116. The reactionary backup scheduling manager 116 may interact with a data storage device 120 and a communication network 110. The data storage device 120 may have a data area 112 and the data area may include file metadata 118.

The networked computer environment 100 may include a plurality of computers 102 and servers 114 and a plurality of data areas 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with data storage device 120 running on server computer 114 via the communications network 110. The communications network 110 may include connections, such as wire, wireless communication links, or fiber optic cables. As will be discussed with reference to FIG. 3, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database.

As previously described, the client computer 102 may access the data storage device 120, running on server computer 114 via the communications network 110. For example, a user using an application program 108 running on a client computer 102 may connect via a communication network 110 to data storage device 120 which may be running on server 114. Additionally, the reactionary backup scheduling manager 116 may record and access information pertaining to a data storage device 120 and a data area 112, such as the frequency of backup and the resilience of locations, etc. in the file metadata 118 of the data area 112.

According to one embodiment, a reactionary backup scheduling manager 116 may monitor disk usage in comparison to disk MTBF, PFA or similar hard disk health monitoring and may record and access such information in the metadata file 118 associated with the data area 112 of the data storage device 120 on a hard disk drive, such as originating (primary) storage device 106 or backup (secondary) storage device 120 and initiate backup operations dependant on the monitoring activities. Then according to at least one implementation, the reactionary scheduling manager 116 may select from one or more mediums to back up to. The reactionary scheduling manager process is explained in more detail below with respect to FIG. 2.

Figure 2:
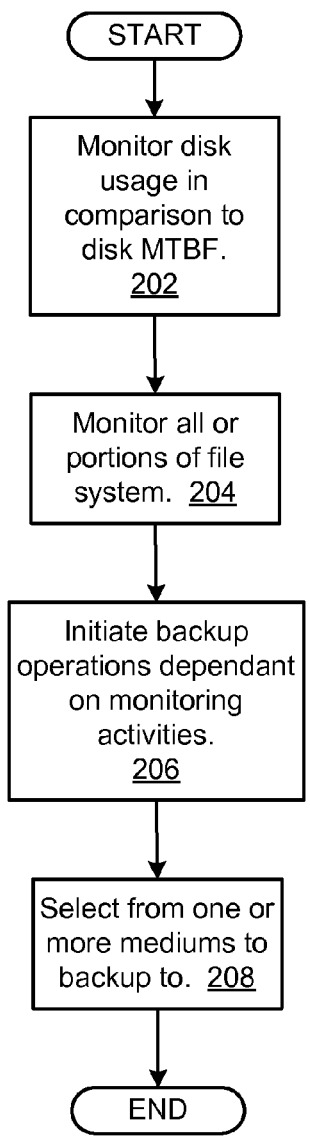
FIG. 2 is an operational flowchart illustrating the steps carried out by a reactionary backup scheduling manager according to at least one embodiment.

Referring now to FIG. 2, an operational flowchart illustrating the steps carried out by a reactionary backup scheduling manager according to one embodiment is depicted. As previously described, a reactionary backup scheduling manager 116 (FIG. 1) may examine the file metadata 118 (FIG. 1) of a data area 112 (FIG. 1) associated with a data storage device 120 (FIG. 1). Additionally, the reactionary backup scheduling manager 116 (FIG. 1) may intelligently determine when to initiate backups based on a function of the mean time between failure (MTBF) or the predictive failure analysis (PFA) of a hard disk drive, such as the originating disk as well as scaling the number of alternate backup locations as a result of the same function.

At 202, the system may monitor disk usage in comparison to disk meantime between failures (MTBF). Meantime between failures (MTBF) is the predicted elapsed time between inherent failures of a system during operation which may be calculated as the arithmetic mean (average) time between failures of a system. In one implementation, the reactionary backup scheduling manager 116 (FIG. 1) may compare a predicted MTBF value to the frequency of hard drive disk usage (i.e., the usage percentage of the hard disk drive). The frequency of hard disk drive usage may change as the hard disk drive 106, 120 (FIG. 1) approaches it's predicted meantime between failures (MTBF). For example, the frequency of hard disk drive usage (i.e., the usage percentage of the hard disk drive) may change based on a bad block or a corrupted sector discovery on a hard disk drive. As such, according to one implementation, the reactionary backup scheduling manager 116 (FIG. 1) may utilize hard disk drive metrics (i.e., manufacturing information and information from drive controllers) associated with a data storage device 106, 120 (FIG. 1) as well as track the usage of a hard disk drive 106, 120 (FIG. 1) in order to determine whether a backup operation may be initiated. For example, a hard disk drive may support 150,000 writes. As such, the reactionary backup scheduling manager 116 (FIG. 1) may utilize this information to determine whether a backup operation may be initiated as the number of writes to the hard drive disk approaches 150,000. Furthermore, according to another implementation, a hard disk drive 106, 120 (FIG. 1) or drive controller may track the usage of the hard disk drive 106, 120 (FIG. 1). As such, the reactionary backup scheduling manager 116 (FIG. 1) may interrogate the hard disk drive 106, 120 (FIG. 1) or the drive controller to obtain the usage of the hard disk drive 106, 120 (FIG. 1) in order to determine whether a backup operation may be initiated. For example, a hard drive disk may have a MTBF of 3000 hours, but has been used for 2000 hours at present. If the user has a pre-determined usage threshold of 67% before initiating a backup of the hard disk drive and the reactionary backup scheduling manager 116 (FIG. 1) has interrogated the drive controller and obtained that 2000 hours (i.e., approaching the 67% of 2010 hours) of disk usage has been reached, then the reactionary backup scheduling manager 116 (FIG. 1) may initiate a backup operation.

Next at 204, the system may monitor all or portions of the file system. For example, according to one embodiment, the reactionary backup scheduling manager 116 (FIG. 1) may monitor specific files; monitor specific files by type; monitor specific files based on an importance value; or monitor the creation of new files. As such, according to one implementation, the reactionary backup scheduling manager 116 (FIG. 1) may access the file metadata 118 (FIG. 1) associated with a data area 112 (FIG. 1) of a data storage device 120 (FIG. 1) to determine whether to initiate a backup operation. Then at 206, the system may initiate backup operations which are dependant on monitoring activities. For example, according to at least one implementation, based on user settings, backup operations may be triggered by the reactionary backup scheduling manager 116 (FIG. 1) when pre-determined thresholds are reached, such as thresholds concerning file system change percentage; percentage or threshold of changes to important files; and creation of new files or threshold of new files. Furthermore, according to at least one implementation, backup operations may be triggered by the reactionary backup scheduling manager 116 (FIG. 1) based on behavior changes as the pre-determined threshold of the MTBF relative to disk usage nears. For example, the backup initiation of a hard disk drive may occur more frequently as disk usage of the hard disk drive approaches the pre-determined MTBF for that hard disk drive or for one or more hard disk drives in an array of hard disk drives. Similarly, according to one embodiment, the reactionary backup scheduling manager 116 (FIG. 1) may initiate a backup based on the behavior changes relative to perceived changes to the disk reliability. For example, the frequency of bad blocks or corrupted sectors on a hard disk drive may increase the frequency of backups.

Then at 208, the system may select from one or more mediums to backup to. For example, the reactionary backup scheduling manager 116 (FIG. 1) may alternate between various backup mechanisms or locations, such as external hard disk drives, cloud backup services, tape drives, offsite storage location, etc. Additionally, according to one implementation, the alternation between backup mediums may be controlled by a threshold of changes or ease of access as a determination of which backup medium to use at various points in the backup process. Furthermore, according to one embodiment, a hard disk drive nearing MTBF may cause more frequency of backups to more resilient destinations rather than choosing backup destinations merely by an ease of access to those backup destinations. Similarly, according to one implementation, an external backup system (i.e., external to the systems being backed up) may take factors such as MTBF and target usage in relation to MTBF into consideration to alter the backup schedule for those systems to be more frequent.

Additionally, according to at least one embodiment, file metadata 118 (FIG. 1) of a data area 112 (FIG. 1) associated with a data storage device 120 (FIG. 1) may store requirements for backup frequency and the number of disparate locations for backup per period of time. Additionally, file metadata 118 (FIG. 1) of a data area 112 (FIG. 1) associated with a data storage device 120 (FIG. 1) may store requirements as to resiliency of the backup medium, and therefore, altering the choice of the backup medium.

Figure 3:
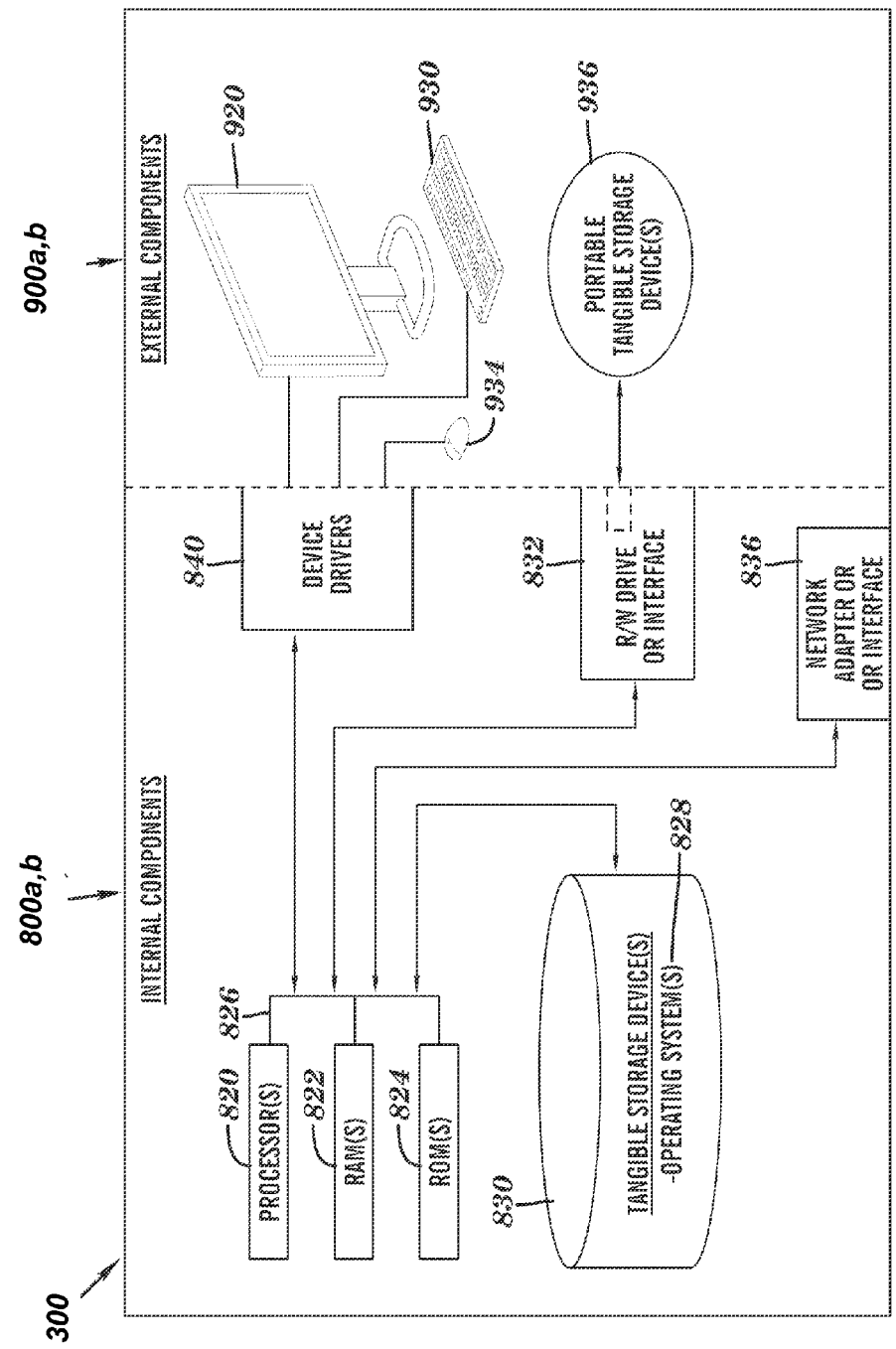
FIG. 3 is a block diagram of internal and external components of computers and servers depicted in FIG. 1 according to at least one embodiment.

FIG. 3 is a block diagram of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server computer 114 (FIG. 1) include respective sets of internal components 800a, b and external components 900a, b illustrated in FIG. 3. Each of the sets of internal components 800a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and software program 108 (FIG. 1) in client computer 102 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program 108 can be stored on one or more of the respective portable computer-readable tangible storage devices 936, read via the respective R/W drive or interface 832 and loaded into the respective hard drive 830.

Each set of internal components 800a, b also includes network adapters or interfaces 836 such as a TCP/IP adapter cards, wireless wi-fi interface cards, or 3G or 4G wireless interface cards or other wired or wireless communication links. A software program 108 in client computer 102 can be downloaded to client computer 102 from an external computer via a network (for example, the Internet, a local area network or other, wide area network) and respective network adapters or interfaces 836. From the network adapters or interfaces 836, the software program 108 in client computer 102 is loaded into the respective hard drive 830. The network may comprise copper wires, optical fibers, wireless transmission, routers, firewalls, switches, gateway computers and/or edge servers.

Each of the sets of external components 900a, b can include a computer display monitor 920, a keyboard 930, and a computer mouse 934. External components 900a, b can also include touch screens, virtual keyboards, touch pads, pointing devices, and other human interface devices. Each of the sets of internal components 800a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for providing a reactionary backup scheduling of a hard disk drive, the method comprising:
   monitoring a disk usage of the hard disk drive;
   comparing the disk usage to an MTBF of the hard disk drive;
   monitoring usage of at least one file of a plurality of files stored on the hard disk drive; and
   initiating the reactionary backup scheduling based on the comparing of the disk usage to the MTBF and the monitoring of the usage of the at least one file in the plurality of files.

2. The method of claim 1, further comprising:
   selecting a backup medium based on the MTBF of the hard disk drive; and
   changing of a backup frequency based on the MTBF of the hard disk drive.

3. The method of claim 2, wherein the changing of a backup frequency of the hard disk drive is based on at least one of a metadata requiring a backup frequency change; the hard disk drive nearing the MTBF; and a discovery that the hard disk drive has at least one bad block.

4. The method of claim 3, wherein the metadata comprises at least one of a requirement for a backup frequency; a number of disparate locations for a backup per a period of time; and a requirement as to resiliency of a backup medium.

5. The method of claim 1, wherein the monitoring of the usage of the at least one file in a plurality of files further comprises at least one of a monitoring of a specific file; a monitoring of a specific type of file; a monitoring of a specific file based on an importance value; and a monitoring of a creation of a new file.

6. The method of claim 1, wherein the initiating of the reactionary backup scheduling is based on at least one of a user setting; a behavior change due to a threshold of the MTBF approaching the disk usage; and a behavior change relative to a perceived change to a disk reliability.

7. The method of claim 1, wherein the selecting of the backup medium comprises a selection of at least one of an external hard disk drive; a cloud backup service; a tape drive, and an off-site storage location.

8. A computer system for providing a reactionary backup scheduling of a hard disk drive, the computer system comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   monitoring a disk usage of the hard disk drive;
   comparing the disk usage to an MTBF of the hard disk drive;
   monitoring usage of at least one file of a plurality of files stored on the hard disk drive; and
   initiating the reactionary backup scheduling based on the comparing of the disk usage to the MTBF and the monitoring of the usage of the at least one file of the plurality of files.

9. The computer system of claim 8, further comprising:
   selecting a backup medium based on the MTBF of the hard disk drive; and
   changing of a backup frequency based on the MTBF of the hard disk drive.

10. The computer system of claim 9, wherein the changing of a backup frequency of the hard disk drive is based on at least one of a metadata requiring a backup frequency change; the hard disk drive nearing the MTBF; and a discovery that the hard disk drive has at least one bad block.

11. The computer system of claim 10, wherein the metadata comprises at least one of a requirement for a backup frequency; a number of disparate locations for a backup per a period of time; and a requirement as to resiliency of a backup medium.

12. The computer system of claim 8, wherein the monitoring of the usage of the at least one file in a plurality of files further comprises at least one of a monitoring of a specific file; a monitoring of a specific type of file; a monitoring of a specific file based on an importance value; and a monitoring of a creation of a new file.

13. The computer system of claim 8, wherein the initiating of the reactionary backup scheduling is based on at least one of a user setting; a behavior change due to a threshold of the MTBF approaching the disk usage; and a behavior change relative to a perceived change to a disk reliability.

14. The computer system of claim 8, wherein the selecting of the backup medium comprises a selection of at least one of an external hard disk drive; a cloud backup service; a tape drive, and an off-site storage location.

15. A computer program product for providing a reactionary backup scheduling of a hard disk drive, the computer program product comprising:
one or more non-transitory computer-readable storage devices and program instructions stored on at least one of the one or more non-transitory computer-readable storage devices, the program instructions executable by a processor, the program instructions comprising:
program instructions to monitor a disk usage of the hard disk drive;
program instructions to compare the disk usage to an MTBF of the hard disk drive;
program instructions to monitor usage of at least one file of a plurality of files stored on the hard disk drive; and
program instructions to initiate the reactionary backup scheduling based on the comparing of the disk usage to the MTBF and the monitoring of the usage of the at least one file in the plurality of files.

16. The program product of claim 15, further comprising:
selecting a backup medium based on the MTBF of the hard disk drive; and
changing of a backup frequency based on the MTBF of the hard disk drive.

17. The program product of claim 16, wherein the changing of a backup frequency of the hard disk drive is based on at least one of a metadata requiring a backup frequency change; the hard disk drive nearing the MTBF; and a discovery that the hard disk drive has at least one bad block.

18. The program product of claim 17, wherein the metadata comprises at least one of a requirement for a backup frequency; a number of disparate locations for a backup per a period of time; and a requirement as to resiliency of a backup medium.

19. The program product of claim 15, wherein the monitoring of the usage of the at least one file in a plurality of files further comprises at least one of a monitoring of a specific file; a monitoring of a specific type of file; a monitoring of a specific file based on an importance value; and a monitoring of a creation of a new file.

20. The program product of claim 15, wherein the initiating of the reactionary backup scheduling is based on at least one of a user setting; a behavior change due to a threshold of the MTBF approaching the disk usage; and a behavior change relative to a perceived change to a disk reliability.

\* \* \* \* \*